US007660368B2

(12) United States Patent
Ling et al.

(10) Patent No.: US 7,660,368 B2
(45) Date of Patent: Feb. 9, 2010

(54) BIT LOG LIKELIHOOD RATIO EVALUATION

(75) Inventors: Fuyun Ling, San Diego, CA (US);
Seong Taek Chung, Redwood City, CA (US); Jinxia Bai, San Diego, CA (US);
Thomas Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 11/330,652

(22) Filed: Jan. 11, 2006

(65) Prior Publication Data

US 2006/0178755 A1 Aug. 10, 2006

Related U.S. Application Data

(60) Provisional application No. 60/643,263, filed on Jan. 11, 2005, provisional application No. 60/643,262, filed on Jan. 11, 2005.

(51) Int. Cl.
*H03D 3/22* (2006.01)
(52) U.S. Cl. .................. 375/332; 341/143; 370/207; 375/262; 375/265; 375/341
(58) Field of Classification Search ................ 375/279, 375/332; 455/130; 714/751
See application file for complete search history.

(56) References Cited

U.S. PATENT DOCUMENTS 6,571,366 B1 * 5/2003 Doetsch et al. ............. 714/751

| 7,386,072 | B2 | 6/2008 | Uno |
|---|---|---|---|
| 7,492,701 | B2 | 2/2009 | Song et al. |
| 7,570,694 | B2 | 8/2009 | Le Goff |
| 2004/0038653 | A1* | 2/2004 | Claussen et al. ............ 455/130 |
| 2006/0171283 | A1 | 8/2006 | Vijayan |
| 2006/0198454 | A1 | 9/2006 | Chung |
| 2006/0227901 | A1 | 10/2006 | Gao et al. |
| 2008/0086670 | A1 | 4/2008 | Krouk et al. |

FOREIGN PATENT DOCUMENTS

WO  04100478  11/2004

OTHER PUBLICATIONS

International Search Report, PCT/US2006/001285 mailed May 12, 2006.

(Continued)

*Primary Examiner*—David C Payne
*Assistant Examiner*—Adolf DSouza
(74) *Attorney, Agent, or Firm*—Gerald P. Joyce, III

(57) ABSTRACT

A system and method are provided for generating bit log likelihood ratio (LLR) values for two-layered Quadrature Phase-Shift Keying (QPSK) turbo decoding in a wireless communications user terminal (UT). The method includes receiving a two-layered QPSK signal with an energy ratio that is unknown, but typically defined as either $k1^2$ or $k2^2$. The method selects a mismatched energy ratio ($k^2$) between $k1^2$ and $k2^2$, and generating bit LLR values for two-layered QPSK turbo decoding, using the mismatched $k^2$ energy ratio. For example, if the received two-layered QPSK signal is known to have an energy ratio of about 4 or about 6.25. Then, $k^2$ is selected to be about 5.0625. Alternately stated, the mismatched $k^2$ energy ratio in selected by determining the approximate midpoint between $k1^2$ and $k2^2$.

4 Claims, 13 Drawing Sheets

OTHER PUBLICATIONS

Papke, L. et al., "Different iterative decoding algorithms for combined concatenated coding and multiresolution modulation," Communications, 1994. ICC '94 Supercomm/ICC '94.

Conference Record, Serving Humanity Through Communications, IEEE International Conference on New Orleans, LA, USA May 1-5, 1994, New York, NY, USA, pp. 1249-1254.

Ramchandran, K. et al. "Multiresolution broadcast for digital HDTV using joint soce-channel coding," Discovering a New World of Communications, Chicago, Jun. 14-18, 1992.

Bound togheter with BO190700, vol. 3, Proceedings of the International Conference on Communications, New York, IEEE, US, vol. 4, Jun. 14, 1992, pp. 556-560.

Lim et al., "Labeling and Decoding Schemes for Backward-Compatible Hierarchial Coded Modulation", pp. 123-128, IEEE 2000.

Papke et al., "Different Iterative Decoding Algorithms for Combined Concatenated Coding and Multiresolution Modulation", Communications, 1994. ICC '94, Supercomm/ICC '94, Conference Record, Serving Humanity Through Communications, IEEE International Confe.

Ramchandran et al., "Multiresolution Broadcast for Digital HDTV Using Joint Source-Channel Coding", Discovering a New World of Communications. Chicago, Jun. 14-18, 1992, Bound Together With B0190700, vol. 3, Proceedings of the Internatonal Conference on C. Schramm, "Multilevel Coding With Independent Decoding on Levels for Efficient Communication on STTIC and Interleaved Fading Channels", pp. 1196-1200, IEEE 1997.

Wang et al., "Soft Decision Metric Generation for QAM with Channel Estimation Error", pp. 1058-1061, IEEE 2002.

* cited by examiner

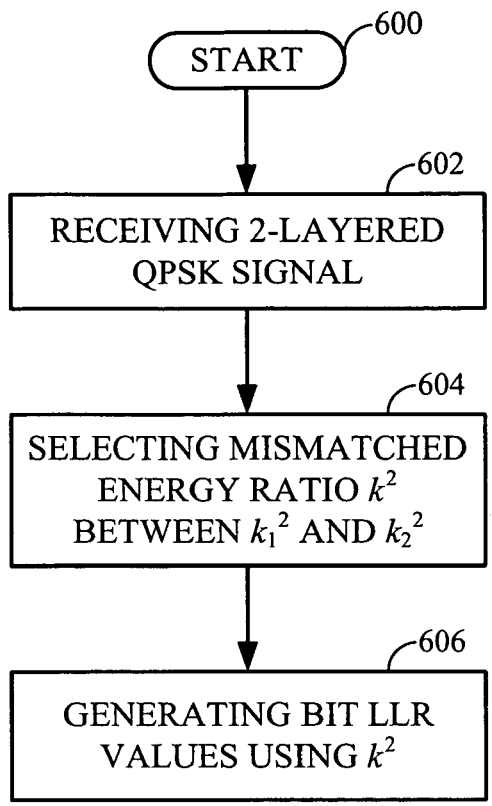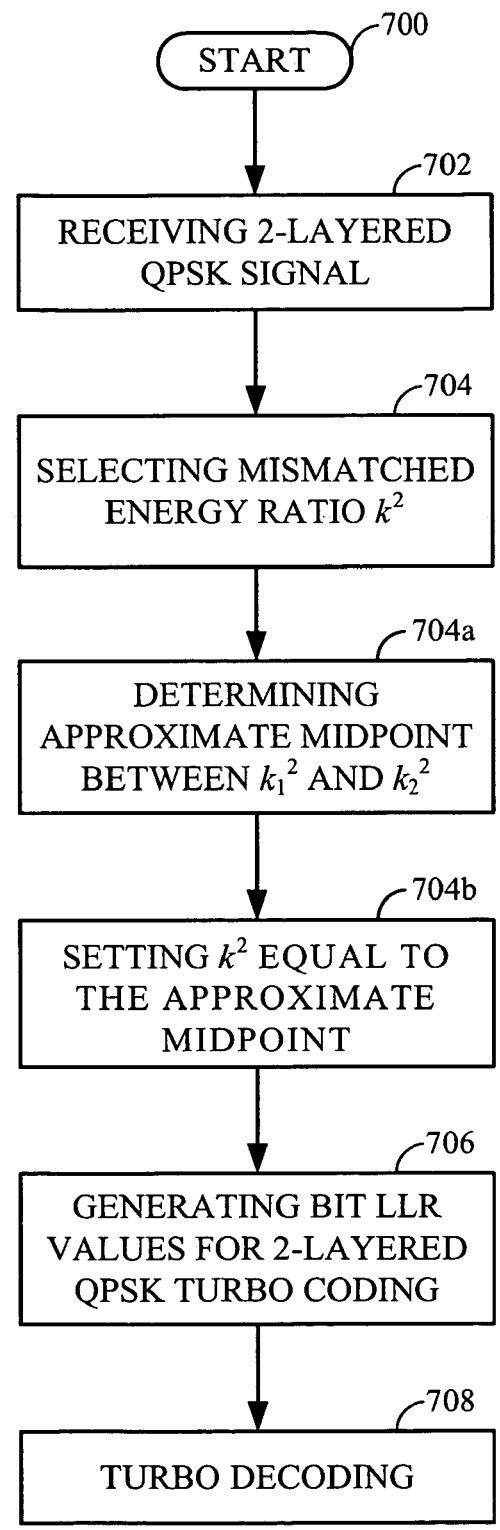
FIG. 6
FIG. 7

BIT LOG LIKELIHOOD RATIO EVALUATION

CLAIM OF PRIORITY UNDER 35 U.S.C. §119

The present Application for Patent claims priority to Provisional Application No. 60/643,263, entitled LAYERED MODULATION, filed Jan. 11, 2005, and Provisional Application No. 60/643,262, entitled A METHOD OF USING ONE DECODING METRIC FOR MULTIPLE SIGNAL CONSTELLATION, filed Jan. 11, 2005, and assigned to the assignee hereof and hereby expressly incorporated by reference herein.

FIELD

This invention generally relates to digital communication formats and, more particularly, to a system and method for efficiently generating bit log likelihood ratio (LLR) values for two-layered Quadrature Phase-Shift Keying (QPSK) turbo decoding, using a mismatched energy ratio.

BACKGROUND

Wireless communication systems are continually striving to increase the data bandwidth so that information can quickly be exchanged between devices coupled to the communication system. Some of the parameters that limit the data bandwidth available to devices include the spectral bandwidth allocated to the devices and the quality of the channel linking the devices.

Wireless communication systems compensate for the various constraints on data bandwidth using a variety of techniques. A wireless communication system may incorporate multiple encoding techniques, and may select an encoding technique based on a data rate supported by a channel. In such a system, the communicating devices may negotiate a data rate based on the capabilities of the channel. Such a communication system may be advantageous for multiple point-to-point links, but may be less than ideal in a distributed broadcast system where a single transmitter provides substantially the same data to multiple receivers.

Wireless communication systems may incorporate hierarchical modulation, also referred to as layered modulation, where multiple data streams are simultaneously transmitted across a hierarchy of data layers. The multiple data streams can include a base layer that is a robust communication link capable of successful reception in nearly all receiver operating conditions. The multiple data streams can also include an enhancement layer that is broadcast at a data rate that is lower, the same, or at a higher data rate than the base layer. The communications over the enhancement layer may require a higher signal quality at the receiver compared to the base layer. Therefore, the enhancement layer may be more sensitive to variations in the quality of the channel.

The receiver is typically ensured the ability to communicate at the base level, and can typically demodulate data on the base layer. In channel conditions sufficient to support the enhancement layer, the receiver is also able to demodulate additional data modulated on the enhancement layer to provide a higher quality of service or to provide additional data bandwidth.

The use of hierarchically modulated signals substantially complicates the receiver operation. Further, the receiver may be a portable receiver that has limited power capacity or limited processing capabilities. The complications to the receiver arising from the incorporation of layered modulation operate in contrast to efforts to reduce the size, power consumption, and cost of a receiver.

SUMMARY

A decoder for a layered modulation system can be configured to independently and concurrently decode each of a base and enhancement layer. The base layer decoder and enhancement layer decoder can be configured substantially in parallel and can each operate concurrently on the same received layered modulation symbol. Each of the base and enhancement layer decoders can be configured with a bit metric module that is configured to determine a signal quality metric based on the received symbol. In systems having turbo encoded data, the bit metric module can be configured to determine a log likelihood ratio (LLR). The ratio is based in part on a channel estimate and an energy ratio used in the layered modulation constellation.

Accordingly, a method is provided for generating bit LLR values for two-layered QPSK turbo decoding in a wireless communications user terminal (UT). The method includes receiving a two-layered QPSK signal with an energy ratio that is unknown, and typically defined as either $k1^2$ or $k2^2$. The method selects a mismatched energy ratio ($k^2$) between $k1^2$ and $k2^2$, and generates bit log likelihood ratio (LLR) values for two-layered QPSK turbo decoding, using the mismatched $k^2$ energy ratio. For example, if the received two-layered QPSK signal is known to have an energy ratio of either about 4 or about 6.25. Then, $k^2$ is selected to be equal to about 5.0625. Alternately stated, the mismatched $k^2$ energy ratio in selected by determining the approximate midpoint between $k1^2$ and $k2^2$.

BRIEF DESCRIPTION OF THE DRAWINGS

FIG. 6 is a flowchart illustrating a method for generating bit LLR values for two-layered QPSK turbo decoding in a wireless communications user terminal (UT).

FIG. 7 is a flowchart showing the method of FIG. 6 with addition details.

DETAILED DESCRIPTION OF THE INVENTION

A receiver and decoders in a receiver can be configured to decode hierarchical or layered modulation data. The receiver operation and processing load is simplified because a base layer decoder can be configured to operate substantially in parallel with an enhancement layer decoder. The base layer and enhancement layer decoders can be configured to operate concurrently on the same received symbol in a layered modulation constellation. The enhancement layer decoder can operate substantially independent of the base layer decoder and does not rely on the results from the base layer decoder when decoding the enhancement layer.

The receiver can be configured to decode hierarchically modulated data that has been turbo encoded. In such an embodiment, the receiver can include a base layer decoder and enhancement layer decoder configured substantially in parallel. Each of the base layer decoder and enhancement layer decoder can include a bit metric module that can be configured to determine a signal quality metric, such as a log likelihood ratio.

The log likelihood ratio values are based, at least in part, on a received signal and a channel estimate. The bit metric modules can be configured to compare channel estimates against a predetermined threshold value to determine if the actual channel estimate or a predetermined value is to be used in the determination of the LLR values. The receiver operation can be simplified by using the same channel estimate threshold value for both the base layer and enhancement layer LLR determination. Different channel estimate thresholds can be used based on different layered modulation energy ratios.

Figure 1:
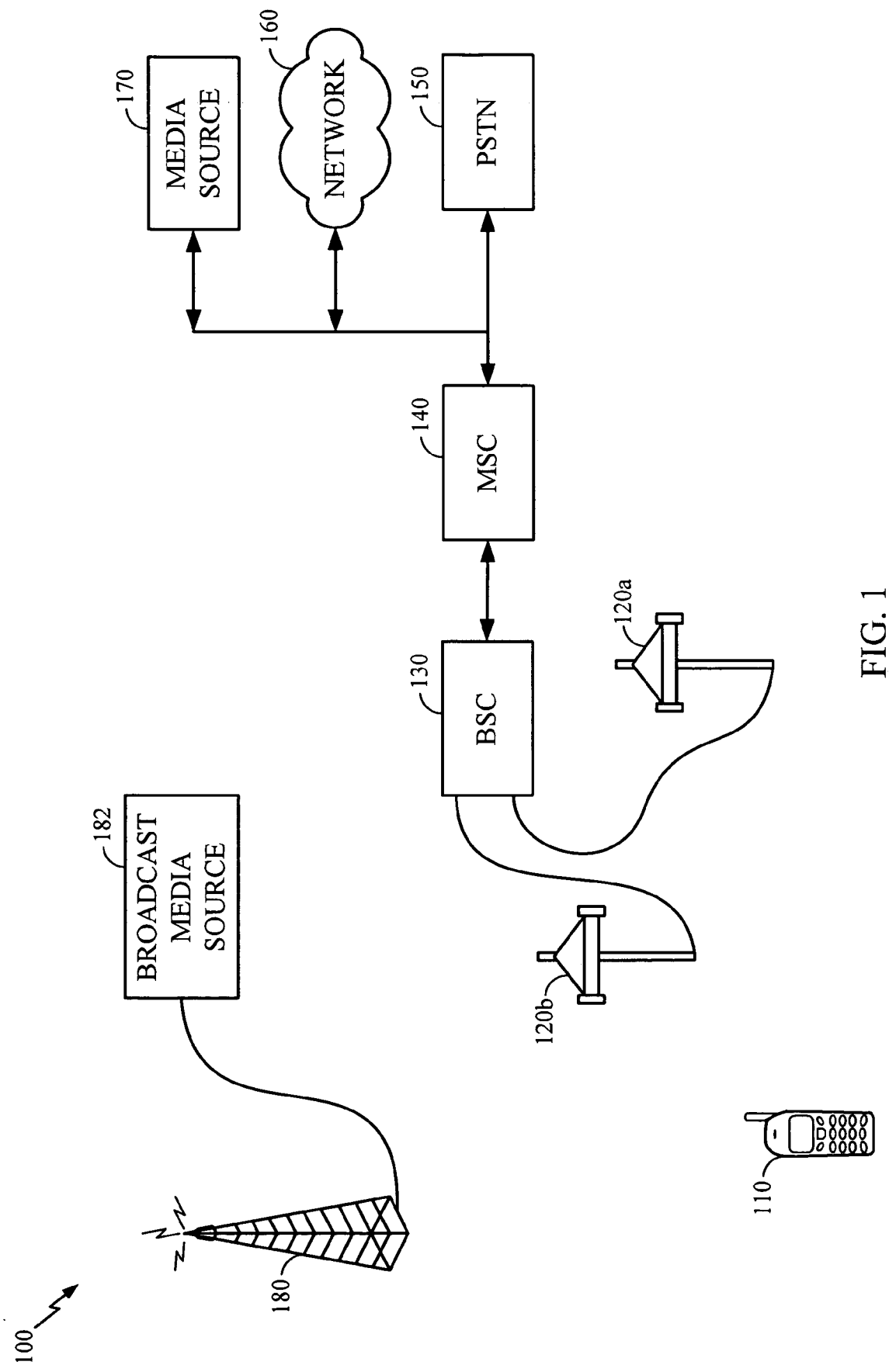
FIG. 1 is a functional block diagram of an embodiment of a wireless communication system incorporating hierarchical modulation.

FIG. 1 is a functional block diagram of an embodiment of a wireless communication system 100 incorporating hierarchical modulation, alternatively referred to as layered modulation. The system includes one or more fixed elements that can be in communication with a user terminal 110. The user terminal 110 can be, for example, a wireless telephone configured to operate according to one or more communication standards using hierarchical coded modulation (i.e., two-layered QPSK). For example, the user terminal 110 can be configured to receive wireless telephone signals from a first communication network and can be configured to receive data and information from a second communication network. In some embodiments, both communication networks can implement hierarchical coded modulation, while in other embodiments, one of the communication networks may implement hierarchical coded modulation.

The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with a base station, for example 120b, which provides the strongest signal strength at a receiver within the user terminal 110.

Each of the base stations 120a and 120b can be coupled to a Base Station Controller (BSC) 140 that routes the communication signals to and from the appropriate base stations 120a and 120b. The BSC 140 is coupled to a Mobile Switching Center (MSC) 150 that can be configured to operate as an interface between the user terminal 110 and a Public Switched Telephone Network (PSTN) 150. The MSC can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 150 is coupled to the PSTN 150 and network 160. The MSC 150 can also be coupled to one or more media source 170. The media source 170 can be, for example, a library of media offered by a system provider that can be accessed by the user terminal 110. For example, the system provider may provide video or some other form of media that can be accessed on demand by the user terminal 110. The MSC 150 can also be configured to coordinate inter-system handoffs with other communication systems (not shown).

In one embodiment, the base stations 120a and 120b can be configured to transmit hierarchically coded signals to the user terminal 110. For example, the base stations 120a and 120b can be configured to transmit a multicast signal that can be directed to the user terminal 110, as well as other receivers (not shown). The hierarchical coded signals can include a base layer signal that is configured to be robust, and an enhancement layer signal that operates at a lower link margin, and as a result, that is more sensitive to variations in the channel. The enhancement layer can be configured to provide supplemental data to the data supplied on the base layer or provide independent data that has a lower quality of service requirement.

The wireless communication system 100 can also include a broadcast transmitter 180 that is configured to transmit a modulated hierarchically coded signal to the user terminal 110. In one embodiment, the broadcast transmitter 180 can be associated with the base stations 120a and 120b. In another embodiment, the broadcast transmitter 180 can be distinct from, and independent of, the wireless telephone system containing the base stations 120a and 120b. The broadcast transmitter 180 can be, but is not limited to, an audio transmitter, a video transmitter, a radio transmitter, a television transmitter, and the like or some combination of transmitters.

The broadcast transmitter 180 can be configured to receive data from a broadcast media source 182 and can be configured to hierarchically code the data, modulate a signal based on the hierarchically coded data, and broadcast the modulated hierarchically coded data to a service area where it can be received by the user terminal 110. The broadcast transmitter 180 can generate, for example, base layer data and enhancement layer data from data received from the broadcast media source 182.

The hierarchical coded data configuration can be advantageous because the enhancement layer does not carry data that is redundant to that carried on the base layer. Additionally, the inability of the receiver to decode the enhancement layer may not result in loss of service. For example, the base layer can be configured to deliver video at a standard video resolution, and the enhancement layer can provide additional data that increases the resolution or signal-to-noise ratio (SNR) of the received video signal. In another embodiment, the base layer can be configured to provide a signal having a predetermined quality, such as a video signal at 15 frames per second, and the enhancement layer can be configured to supplement the information carried on the base layer. For example, the enhancement layer can be configured to carry information used to support a video signal at 30 frames per second. In such a configuration, the inability to decode the enhancement layer data results in lower resolution signal, lower signal quality, or SNR, but not a complete loss of signal.

The user terminal 110 can be configured to demodulate the received signal and decode the base layer. The receiver in the user terminal 110 can implement error control mechanisms as a standard part of the base layer decoder. The receiver in the user terminal 110 can use the error control mechanisms of the base layer decoder to determine a probability of successful enhancement layer decoding. The receiver in the user terminal 110 can then determine whether to decode the enhancement layer based on statistics or metrics generated in the error control mechanisms used in the base layer decoding.

In another embodiment, the user terminal 110 can be configured to substantially decode the base layer and enhancement layers concurrently, without relying on base layer information when decoding the enhancement layer. For example, the user terminal 110 can be configured to determine a single decoder threshold value and use the single decoder threshold value when decoding both the base and enhancement layer. The decoder threshold can be based in part on a characteristic of the hierarchically modulated data. For example, the decoder threshold can be based on a ratio of the power or energy of the enhancement layer relative to the base layer. The decoder threshold can also be based in part on a desired error rate, such as a symbol error rate, bit error rate, packet error rate, or frame error rate. The decoder threshold can be fixed or may vary based, for example, on varying desired quality of service or varying characteristics of the hierarchically modulated data.

Figure 2A:
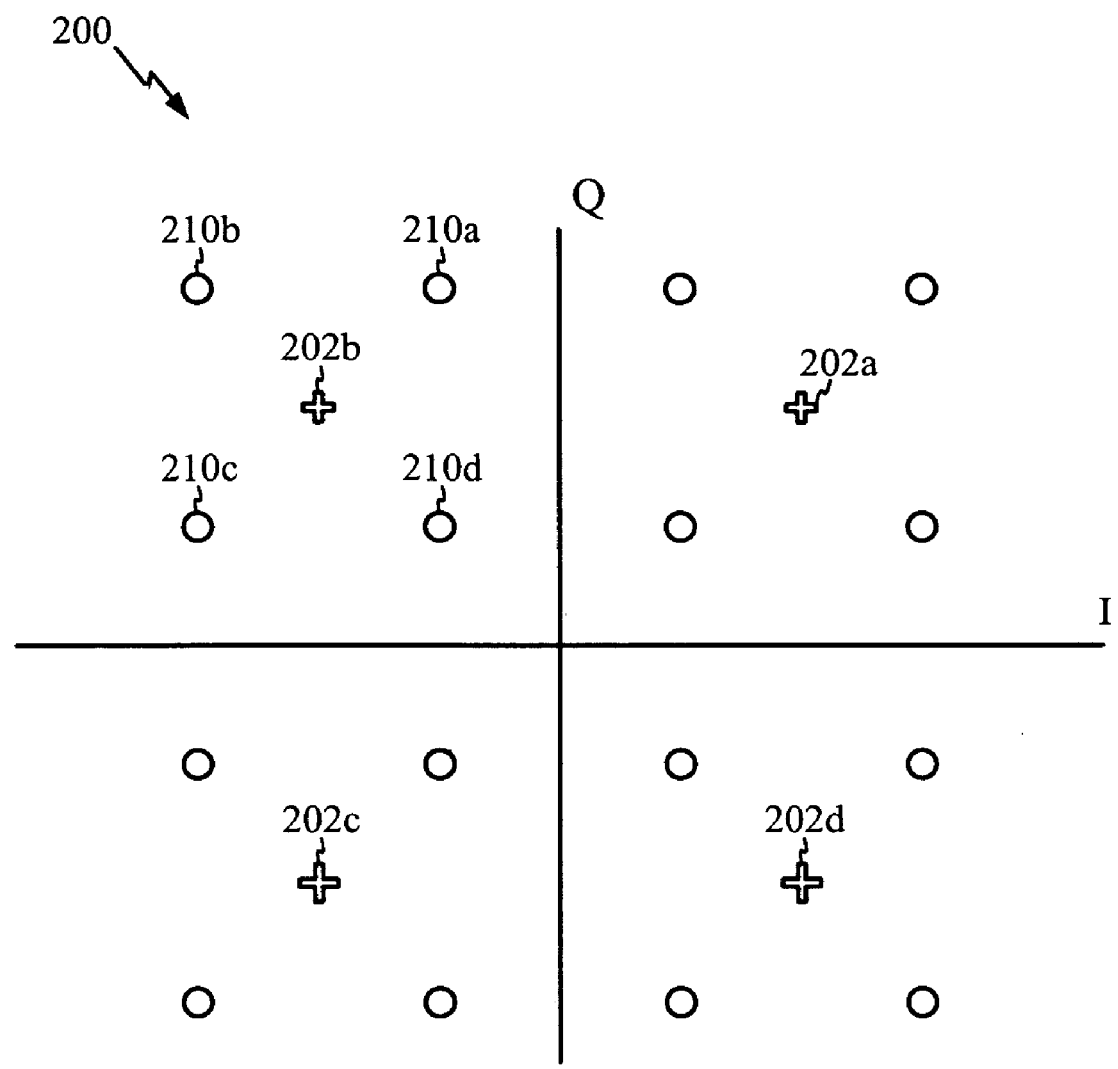
FIGS. 2A and 2B are constellation diagrams of a hierarchical modulation.
Figure 2B:
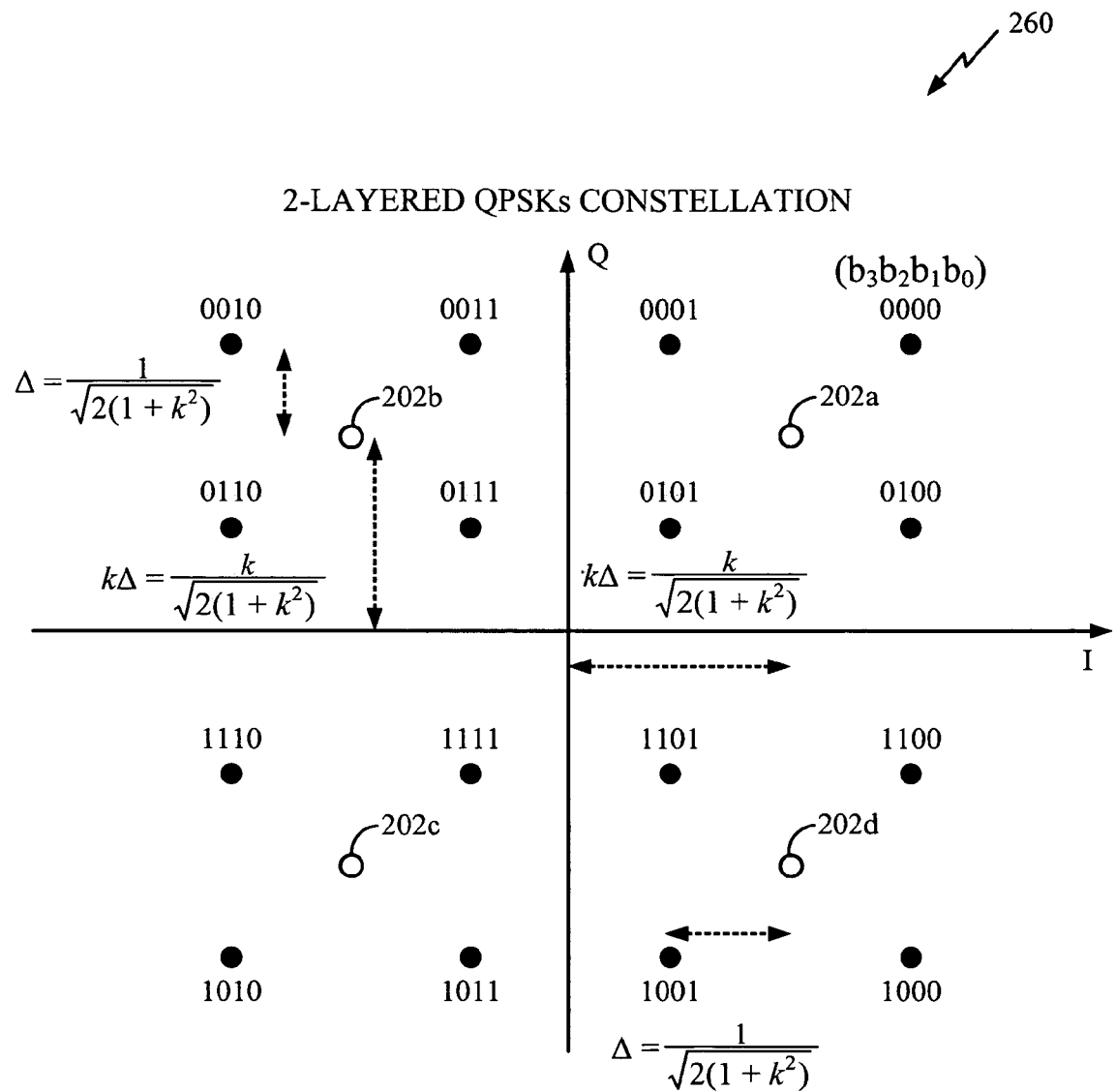

FIGS. 2A and 2B are constellation diagrams of a hierarchical modulation. As an example, the wireless communication system 100 of FIG. 1 may implement hierarchical modulation in the manner shown in FIG. 2A. The hierarchical modulation implementation can be referred to as Quadrature Phase-Shift Keying (QPSK) on QPSK. The implementation includes a QPSK modulated base layer. Although a QPSK on QPSK hierarchical modulation implementation is illustrated in FIG. 2A, the decoder apparatus and methods disclosed herein are not limited to any particular type of hierarchical modulation. For example, other hierarchical modulation embodiments may use 16-QAM over QPSK, or some other form of hierarchical modulation.

The QPSK base layer is defined by four points 202a-202d. However, as described later, the points do not need to correspond to actual constellation points in the hierarchical modulation. The enhancement layer is also QPSK modulated. The QPSK modulated enhancement layer occurs on top of the QPSK base layer constellation. The QPSK constellation for the enhancement layer includes four positions, but the constellation can be centered about any of the four constellation points 202a-202d of the base layer.

As an example, a base layer point 202b occurs in the second quadrant, where the in-phase (I) signal component is negative and the quadrature (Q) signal component is positive. On top of the base layer point 202b are four constellation points 210a-210d of the enhancement layer. Similarly, each quadrant, corresponding to a point 202a-202d of the base layer, has four constellation points of the enhancement layer.

The base and enhancement layer data can be mapped to a constellation symbol based on a predetermined map or algorithm. For example, the base layer data and enhancement layer data can each include two bits per symbol, such that the combination of the base layer and enhancement layer data is four bits. The mapping operation can take the four bits and map them to a symbol from a predetermined constellation, such as a 16-QAM constellation or a QPSK on QPSK constellation.

FIG. 2B is a constellation diagram 260 of an embodiment of a particular hierarchical modulation implementation. The constellation diagram 260 of FIG. 2B is substantially a 16-QAM constellation in which the base layer data maps to a particular quadrant of the constellation, and the enhancement layer data maps to the particular position within the constellation. The 16-QAM constellation 260 does not need to be consistently spaced, but may be modified to have a consistent spacing within each quadrant and a distinct spacing between the nearest points within different quadrants. Furthermore, some of the points in the constellation may be mirrored with respect to a midpoint in the quadrant.

The input to a signal mapping block includes 2 bits from the base layer ($b_3$ $b_1$) and 2 bits from the enhancement layer ($b_2$ $b_0$). The base layer stream is transmitted at a higher power level with respect to the enhancement layer stream and the energy ratio $k^2$ The same energy ratio can be used for multiple tones in the same logical channel of an OFDM system, where a logical channel can include one or more tones from the OFDM group of tones. However, the energy ratio can change from logical channel to logical channel. Therefore, the signal mapping block can map the same data to different constellations depending on the energy ratio, with the constellation determined by the energy ration.

For example, a signal mapping block can be configured to map base and enhancement layer data to one of two constellations, where the two constellations correspond to energy ratios of 4 and 9. Note, the layered modulation signal constellation follows the Gray mapping, and the signal constellation for layered modulation is equivalent to the signal constellation of 16-QAM when the energy ratio, $k^2$, is equal to 4.

In other embodiments, the signal constellation for layered modulation is a simple addition of two scaled QPSK signal constellation. Such a simple additions of QPSK constellations does not follow a Gray mapping rule as does the constellation shown in FIG. 2B. A signal constellation that does not follow Gray mapping may provide reduced performance compared to a constellation conforming to Gray mapping.

The underlying data defining the respective quadrants of the base and enhancement layers can be encoded using one or more encoding processes. The encoding process used can be any encoding process, and the type of encoding is not a limitation on the decoding apparatus and methods disclosed herein, except where the decoder is specific to a particular encoder. The encoder can include, for example, a convolutional encoder, a turbo encoder, a block encoder, an interleaver, a CRC encoder, a combination of encoders, and the like, or some other process or apparatus for encoding data.

Figure 3:
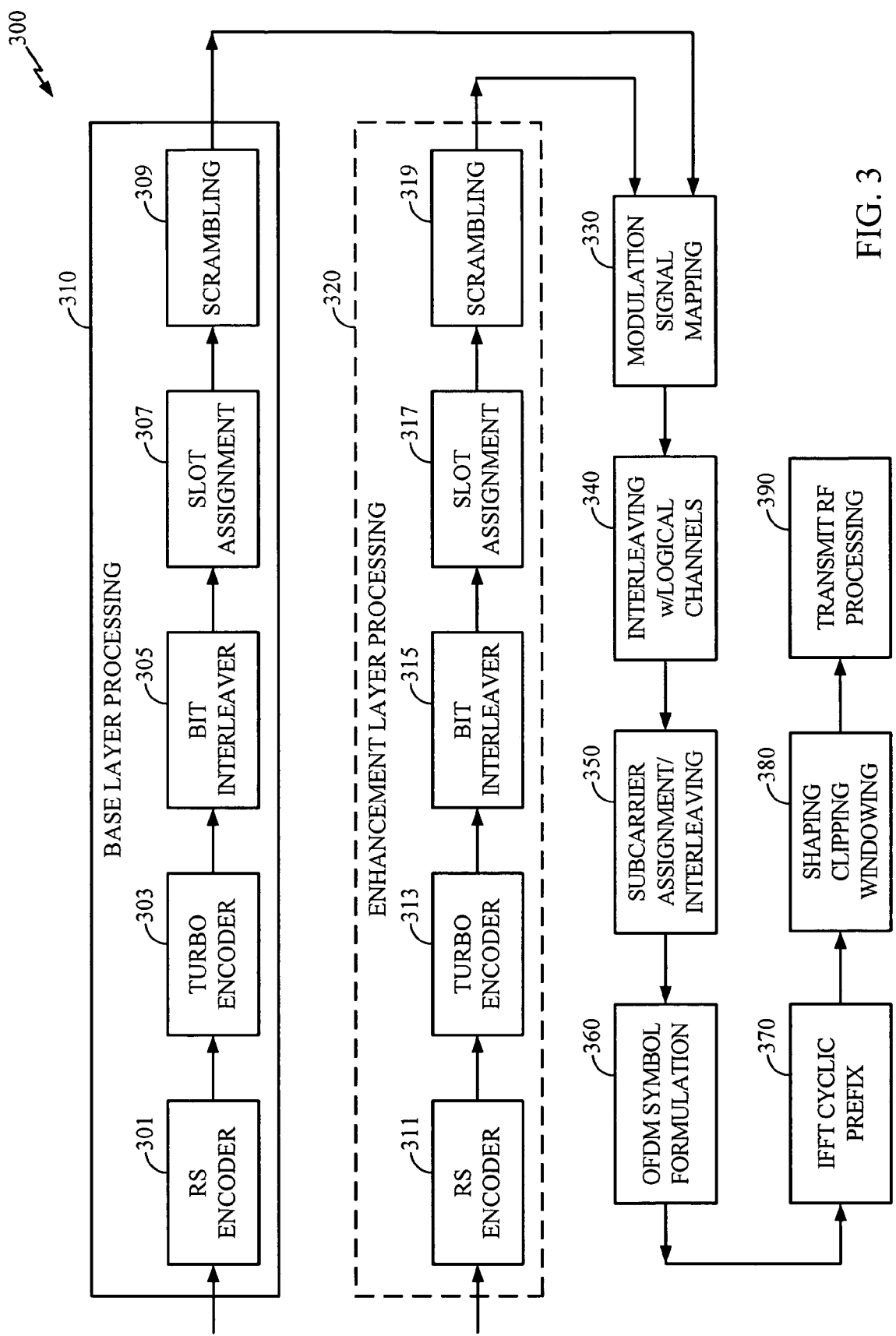
FIG. 3 is a functional block diagram of an embodiment of a transmitter in a hierarchical coded modulation system.

FIG. 3 is a functional block diagram of an embodiment of a transmitter 300 configured for a hierarchical coded modulation system. In one embodiment, the transmitter 300 can be implemented in the broadcast transmitter of the system of FIG. 1. The transmitter 300 of FIG. 3 can be configured for hierarchical modulation in an Orthogonal Frequency Division Multiple Access (OFDMA) or Orthogonal Frequency Division Multiplex (OFDM) system using the constellation of FIG. 2B. However, the transmitter 300 shown in FIG. 3 represents an embodiment and is not a limitation on the disclosed decoder apparatus and methods. For example, a single carrier system can be modulated with hierarchically coded data, and the corresponding decoder in a receiver can be configured to operate on a single carrier with layered modulation.

The transmitter 300 can include substantially similar base layer and enhancement layer processing blocks, 310 and 320, respectively. The base layer processing block 310 can be configured to process base layer data into a desired modulation format, for example QPSK. The enhancement layer processing block 320 can be similarly configured to process enhancement layer data into a desired modulation format, for example QPSK.

The base layer processing block 310 and the enhancement layer processing block 320 receive the respective data from a source encoder (not shown), which can be the broadcast media source of FIG. 1. In one embodiment, the base layer data and the enhancement layer data can include video signals, audio signals, or some combination of video and audio signals. The video/audio signal in the base layer corresponds to the data required to reproduce basic quality of service at the receiver. The video/audio signal in the enhancement layer corresponds to the additional data required to generate more enhanced quality of service at the receiver. Hence, users capable of decoding two layers (base layer and enhancement layer) can enjoy fully enhanced quality of video/audio signal while users capable of decoding the base layer can get a minimum quality of video/audio signal.

Within each of the base layer processing block 310 and the enhancement layer processing block 320, the data is coupled to a Reed Solomon encoder 301 or 311 for block coding. The output of the Reed Solomon encoders 301 and 311 are coupled to respective turbo encoders 303 and 313. The turbo encoders 301 and 311 can be configured to turbo encode the data according to a predetermined encoding rate. The encoding rate can be fixed or selectable from a plurality of encoder rates. For example, the turbo encoders 301 and 311 can independently be configured to provide a coding rate of 1/3, 1/2, or 2/3.

The turbo encoder 303 and 313 outputs are coupled to respective bit interleavers 305 and 315 to improve resistance to burst errors. The output of the bit interleavers 305 and 315 are coupled to respective slot assignment modules 307 and 317. The slot assignment modules 307 and 317 can be configured to time align the encoded symbols with a predetermined time slot, such as an interleaving time slot in a time division multiplexed system. The outputs of the slot alignment modules 307 and 317 are coupled to respective scramblers 309 and 319. The output of the scramblers 309 and 319 represent the encoded base layer and enhancement layer symbols.

The symbols from the two layers are combined at a signal mapping block 330. The signal mapping block 330 can be configured to map the base and enhancement layer symbols to a particular point in the constellation for the layered modulation. For example, the signal mapping block 330 can be configured to map a pair of base layer symbols along with a pair of enhancement layer symbols to a single point in the layered modulation constellation. The signal mapping block 330 can be configured to map each logical channel to a constellation having a predetermined energy ratio. However, different logical channels can be mapped to constellations having different energy ratios.

The output of the signal mapping block 330 is coupled to a time interleaver 340 that is configured to interleave the mapped constellation point to a particular logical channel. As described earlier, the system may implement a time division multiplex configuration where a single logical channel is time multiplexed with a plurality of other logical channels. The aggregate of logical channels can be time interleaved, or otherwise time multiplexed, using a predetermined time multiplex algorithm, such as a round robin assignment.

The output of the time interleaver 340 is coupled to a subcarrier assignment module 350. The subcarrier assignment module can be configured to assign one or more tones, frequencies, or subcarriers from an OFDM tone set to each set of time interleaved logical channels. The subset of subcarriers assigned to a set of time interleaved logical channels can range from one channel to a plurality of subcarriers up to all available subcarriers. The subcarrier assignment module 350 can map a serial time interleaved set of logical channels to a subset of subcarriers according to a predetermined algorithm. The predetermined algorithm can be configured to assign the logical channels in a persistent manner, or can be configured to assign subcarriers according to a frequency hopping algorithm.

The output of the subcarrier assignment module 350 is coupled to an OFDM symbol module 360 that is configured to modulate the subcarriers based on the assigned layered modulation symbol. The modulated OFDM subcarriers from the OFDM symbol module 360 are coupled to an IFFT module 370 that can be configured to generate an OFDM symbol and append or prepend a cyclic prefix or a predetermined length.

The OFDM symbols from the IFFT module 370 are coupled to a shaping block 380 where the OFDM symbols can be shaped, clipped, windowed, or otherwise processed. The output of the shaping block 380 is coupled to a transmit RF processor 390 for conversion to a desired operating frequency band for transmission. For example, the output of the transmit RF processor 390 can include or be coupled to an antenna (not shown) for wireless transmission.

Figure 4:
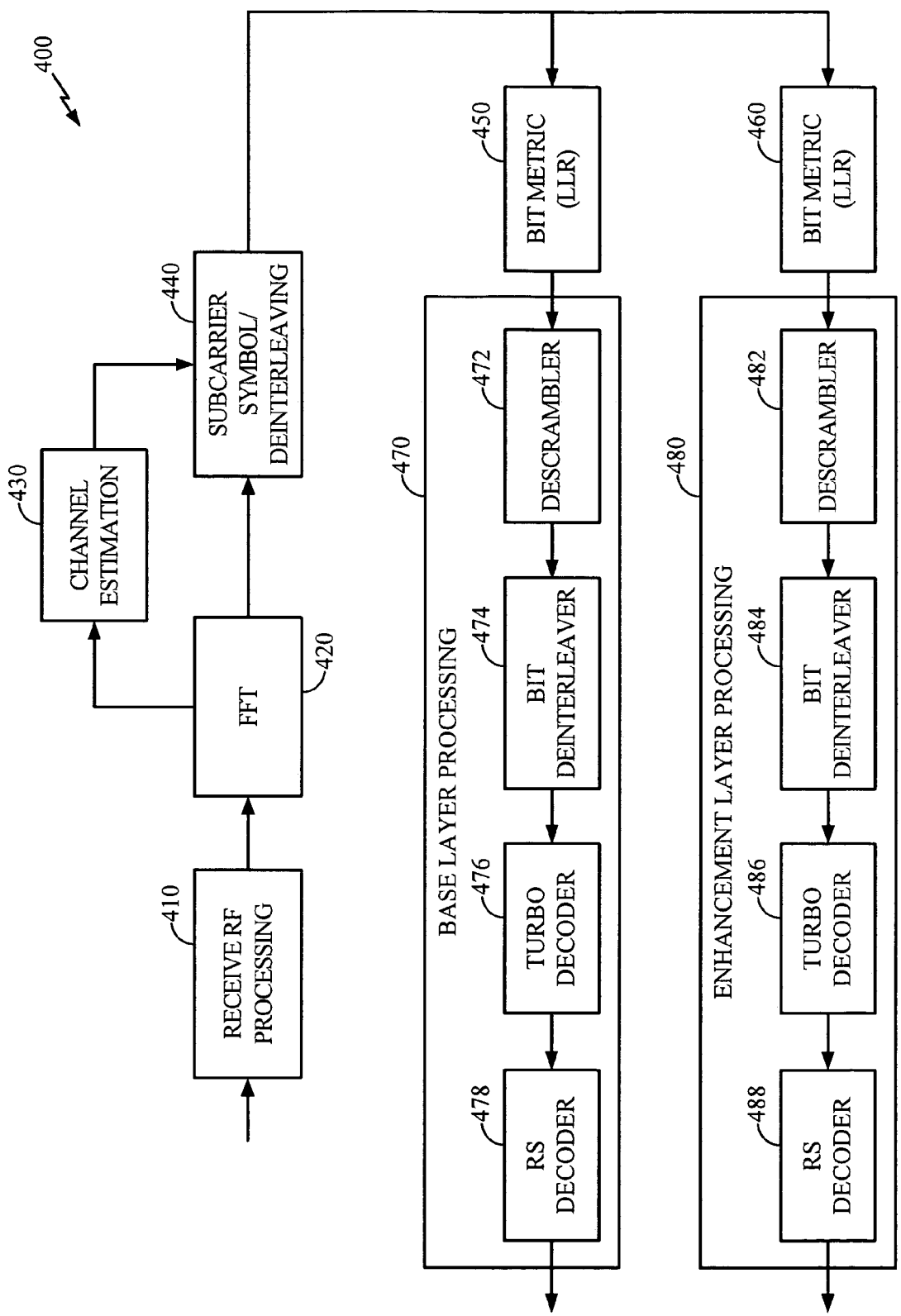
FIG. 4 is a functional block diagram of an embodiment of a receiver configured for operation in a hierarchical modulation system.

FIG. 4 is a functional block diagram of a receiver 400 configured to decode the hierarchical modulated data generated by the transmitter of FIG. 3. In one embodiment, the receiver 400 can be implemented in the user terminal of the system of FIG. 1.

The receiver 400 includes a receive RF processor configured to receive the transmitted RF OFDM symbols, process them and frequency convert them to baseband OFDM symbols or substantially baseband signals. A signal can be referred to as substantially a baseband signal if the frequency offset from a baseband signal is a fraction of the signal bandwidth, or if signal is at a sufficiently low intermediate frequency to allow direct processing of the signal without further frequency conversion. The OFDM symbols from the receive RF processor 410 are coupled to an FFT module 420 that is configured to transform the OFDM symbols to the hierarchically modulated frequency domain subcarriers.

The FFT module 420 can be configured to couple one or more subcarriers, such as predetermined pilot subcarriers, to a channel estimator 430. The pilot subcarriers can be, for example, one or more equally spaced sets of OFDM subcarriers. The channel estimator 430 is configured to use the pilot subcarriers to estimate the various channels that have an effect on the received OFDM symbols. In one embodiment, the channel estimator 430 can be configured to determine a channel estimate corresponding to each of the subcarriers. The channel estimates at a particular subcarrier can be used as a channel estimate for adjacent subcarriers, for example, those subcarriers within a predetermined coherence bandwidth of the pilot subcarrier.

The subcarriers from the FFT module 420 and the channel estimates are coupled to a subcarrier symbol deinterleaver 440. The symbol deinterleaver 440 can be configured to reverse the symbol mapping performed by the subcarrier assignment module of FIG. 3.

The receiver 400 is configured to perform base layer decoding and enhancement layer decoding on each OFDM subcarrier or tone. FIG. 4 illustrates a single base layer decoder and enhancement layer decoder for the sake of clarity and brevity.

The base layer decoder and enhancement layer decoder can operate substantially in parallel. Each of the decoder modules can be configured to operate concurrently on the same received symbols. The enhancement layer decoder can thus operate substantially independently of the base layer decoder and does not rely on the results of the base layer decoder when decoding the enhancement layer data.

The decoders illustrated in the receiver 400 embodiment of FIG. 4 are configured to decode turbo encoded layered modulation data. Of course, if the transmitter is configured to generate some other type of encoding, the decoders in the receiver 400 would be matched to the encoder type. For example, the transmitter can be configured to encode the data using turbo coding, convolutional coding, Low Density Parity Check (LDPC) coding, or some other encoding type. In such an embodiment, the receiver 400 is configured with the complementary decoders. Thus, each of the base layer decoders and enhancement layer decoders in the receiver 400 can be configured to provide turbo decoding, convolutional decoding, such as using Viterbi decoding, LDPC decoding, or some other decoder or combination of decoders.

Each of the hierarchically modulated tones is coupled to a base layer bit metric module 450 and an enhancement layer bit metric module 460. The bit metric modules 450 and 460 can operate on the hierarchically modulated tone to determine a metric indicative of the quality of the received symbol.

In one embodiment, where the symbols are turbo coded, the bit metric modules 450 and 460 can be configured to determine a log likelihood ratio (LLR) of the received symbol. The LLR is the logarithm of the likelihood ratio. The ratio can be defined as the probability that the original bit is 1 over the probability that the original bit is equal to 0. Alternatively, the ratio can be defined in a reverse way, where the LLR is the probability that the original bit is 0 over the probability that the original bit is equal to 1. There is no substantial difference between these two definitions. The bit metric modules 450 and 460 can use, for example, the symbol magnitudes and the channel estimate to determine the LLR values.

Each bit metric module 450 and 460 utilizes a channel estimate and a received signal to determine a LLR value. A noise estimate may also be used. However, the noise estimate term can be substantially ignored if a turbo decoding method that provides the same results regardless of the noise estimate is used. In such an embodiment, the bit metric modules 450 and 460 hardware can use a predetermined value as the noise estimate in calculating LLR values.

The output of the base bit metric module 450 is coupled to a base layer processor 470. The output of the enhancement layer bit metric module 460 is coupled to an enhancement layer processor 480 that functionally, operates similarly to the base layer processor 470. For example, the LLR values are coupled from the bit metric modules 450 and 460 to the respective base layer or enhancement layer processors 470 and 480.

The base layer processor 470 includes a descrambler 472 configured to operate on the received LLR values to reverse the symbol scrambling performed in the encoder. The output of the symbol descrambler 472 is coupled to a bit interleaver 474 that is configured to deinterleave the previously interleaved symbols. The output of the bit deinterleaver 474 is coupled to a turbo decoder 476 that is configured to decode turbo encoded symbols according to the coding rate used by the turbo encoder. For example, the turbo decoder 476 can be configured to perform decoding of rate 1/3, 1/2, or 2/3 turbo encoded data. The turbo encoder 476 operates, for example, on the LLR values. The decoded outputs from the turbo decoder 476 is coupled to a Reed Solomon decoder 478 that can be configured to recover the base layer bits based in part on the Reed Solomon encoded bits. The resulting base layer bits are transferred to a source decoder (not shown).

The enhancement layer processor 480 operates similar to the base layer processor 470. A descrambler 482 receives the LLR values from the enhancement bit metric module 460. The output is coupled to a bit deinterleaver 484 and the turbo decoder 486. The output of the turbo decoder 486 is coupled to the Reed Solomon decoder 488. The resulting enhancement layer bits are transferred to a source decoder (not shown).

The exact expression for the LLR is given by:

$$LLR_n = \ln\left(\sum_{G(S):b_n=0} \exp\left(-\frac{|r - cG(S)|^2}{N_0}\right)\right) - \ln\left(\sum_{G(S):b_n=1} \exp\left(-\frac{|r - cG(S)|^2}{N_0}\right)\right).$$

In the equation, $LLR_n$ is the LLR of the n'th bit encoded by the modulation symbol and $b_n$ denotes the n'th bit of the constellation point $G(S)$. The value r represents the received symbol, c represents the channel estimate, and $N_0$ represents the noise estimate. Computing the exact solution is generally too complicated or processing intensive to be implemented in practice. An approximation can be determined as the maximum of the variables. For QPSK this approximation in fact corresponds to the exact LLR expression. For two-layered QPSK with energy ratio $k^2$, the approximation is described in detail below.

In the LLR calculation block the LLR value depends on a channel estimate from the channel estimation block. The performance of each layer depends on a threshold value being used in the channel estimation algorithm. The channel estimation threshold value represents a value over which the channel estimate is used. That is, if the channel estimate exceeds the threshold value, the actual channel estimate is used. Conversely, if the channel estimate is less than the threshold value, the channel estimate is assigned a predetermined value, which can be, for example, zero or some other sufficiently small value. If the channel estimate is equal to the threshold value, the receiver can be configured to use the actual channel estimate or use the predetermined value. Either option is practical, provided the decision is executed consistently.

The channel estimation module in the receiver estimates the channel for each tone in a multiple channel system, such as an OFDM system. Thus, the channel estimation module or each bit metric module can compare the channel estimate to the threshold. It may be advantageous to perform the comparison of the channel estimate to the threshold at the bit metric modules, because the optimal threshold value can depend on the energy ratio.

The threshold can be optimized for the following two channel models; Repeated International Telecommunications Union (ITU) Pedestrian B (PEDB) model with 120 km/hr and repeated Advanced Television Systems Committee (ATSC) model with 20 km/hr.

Figure 5:
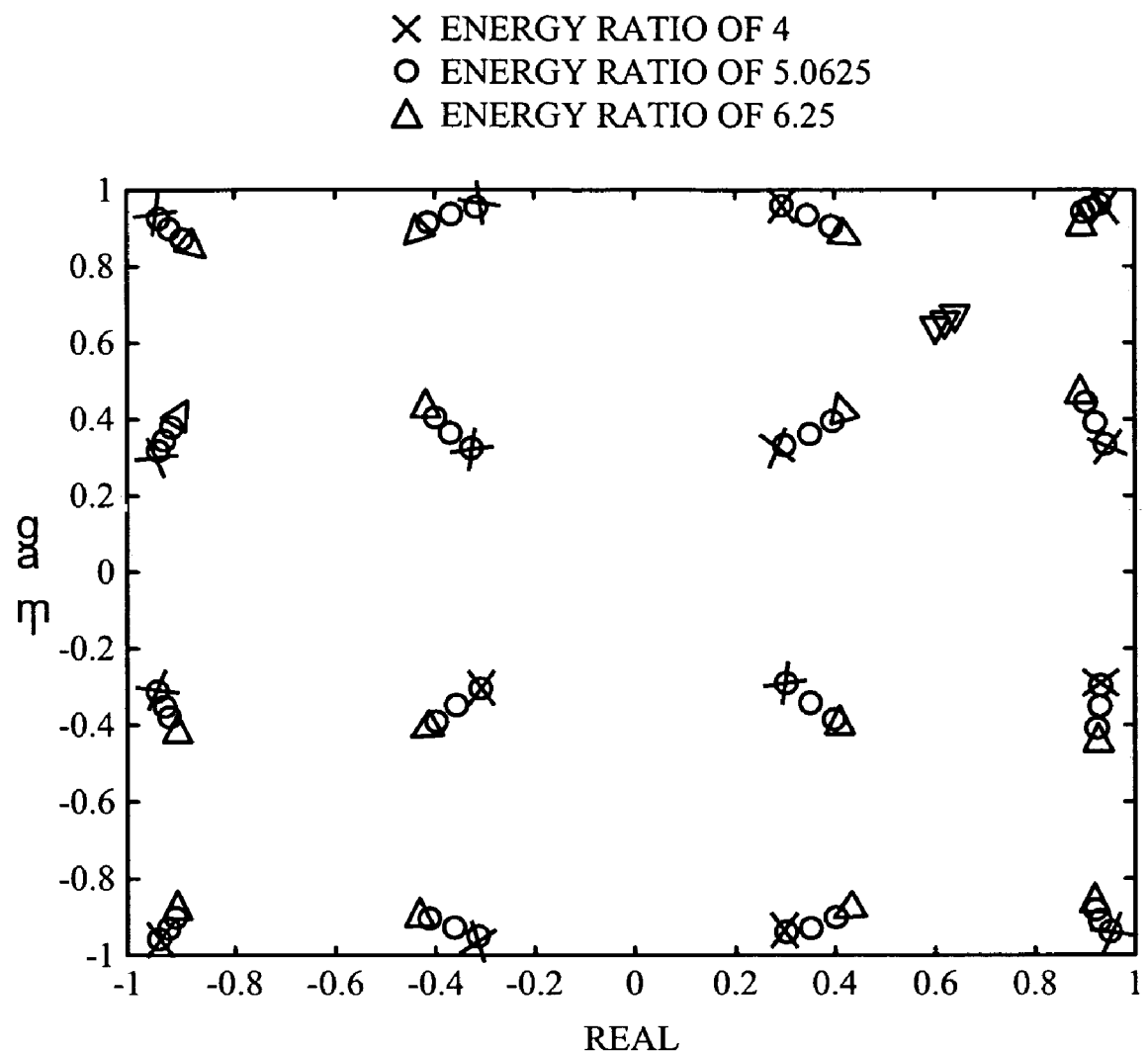
FIG. 5 is a detailed depiction of a two-layered QPSK constellation diagram showing variations in the energy ratio.

FIG. 5 is a detailed depiction of a two-layered QPSK constellation diagram showing variations in the energy ratio. Shown are energy ratios ($k^2$) of 4, 5.0625, and 6.25.

Referring again to FIG. 2B, a two-layered QPSK constellation is depicted showing the relationship between layers with an energy ratio ($k^2$) of 4. The value k can be depicted in the diagram as the Real component a base layer point, divided by the Real component of the difference between the base layer point and one of the enhancement layer points.

In some circumstances, a receiver may not be aware of the energy ratio (i.e., 4.0 or 6.25) used by the transmitter. The present invention describes a process for efficiently decoding two-layered QPSK data in this circumstance. The receiver defines the relationship between constellation layers as in FIG. 2B, even if the energy ratio is unknown, as well as a turbo code rate of 1/3, 1/2, or 2/3. The bit-width of input and output are 9-bit signed integer (9s) and 6-bit signed (6s) integer as required. The decoding metric minimizes the complexity of hardware implementation at the receiver side, with only a small performance degradation, by using a mismatch energy ratio that works for both energy ratio extremes. That is, the mismatch energy ratio can be used to generate bit LLR for the turbo decoder, with a worst case performance degradation of 0.1 dB for a repeated PEBD channel (120 km/hr) and a repeated ATSC channel (20 km/hr).

FIG. 6 is a flowchart illustrating a method for generating bit LLR values for two-layered QPSK turbo decoding in a wireless communications user terminal (UT). Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 receives a two-layered QPSK signal with an energy ratio that is typically about $k1^2$ or about $k2^2$. Step 604 selects a mismatched energy ratio ($k^2$) between $k1^2$ and $k2^2$. Step 606 generates bit LLR values for two-layered QPSK turbo decoding, using the mismatched $k^2$ energy ratio.

FIG. 7 is a flowchart showing the method of FIG. 6 with addition details. The method starts at Step 700. Step 702 receives a two-layered QPSK signal with an energy ratio that is unknown, but typically defined as either $k1^2$ or $k2^2$. Step 704 selects a mismatched energy ratio ($k^2$) between $k1^2$ and $k2^2$. Step 706 generates bit LLR values for two-layered QPSK turbo decoding, using the mismatched $k^2$ energy ratio. For example, Step 702 may receive a two-layered QPSK signal with an energy ratio of either about 4 or about 6.25. Then, Step 704 selects $k^2$ to be equal to about 5.0625. Step 708 turbo decodes using the bit LLR values generated in Step 706.

In one aspect, selecting the mismatched $k^2$ energy ratio in Step 704 includes substeps. Step 704a determines the approximate midpoint between $k1^2$ and $k2^2$, and Step 704b sets $k^2$ equal to the approximate midpoint. Note, the approximate midpoint may be determined on-the-fly, or it may be a predetermined value that is loaded and set in the factory, or upon initialization of the UT device. The term "approximate" is used to account for errors in the transmission and receiving processes, as well as the limitations imposed by using a limited number of bit places for calculations. In another aspect, Step 706 generates bit LLR values for two-layered QPSK turbo decoding with a worst-case degradation of less than 0.1 dB (see Table 1, below).

As described in detail above, Step 702 receives a two-layered QPSK signal with in phase (I) and quadrature (Q) components per symbol, and Step 706 generates the LLR values for four bits (b3, b2, b1, and b0) using the mismatched $k^2$ energy ratio.

More explicitly, since the LLR values for b0 and b2 only depend on the Real component of the complex received signal (r), the LLR values can be determined for each b0 and b2 bit as follows:

$$LLR_{2,0} = \frac{1}{N_0} \times \frac{2}{1+k^2} \times (|J| - k \cdot C^* \cdot C);$$

where J is v for b0, and w for b2;
$v = \sqrt{2(1+k^2)} \text{Re}[C^*r]$;
$w = \sqrt{2(1+k^2)} \text{Im}[C^*r]$;
r is the complex received signal;
C is the complex channel estimate; and,
C* is the complex conjugate of C.

Likewise, the LLR values are determined for each b1 and b3 bit as follows:

$$LLR_1 = \frac{1}{N_0} \times \frac{2}{1+k^2} \times sgn(J) \times \begin{cases} (k-1)|J| & \text{if } |J| \le k \cdot C^* \cdot C \\ k(|J| - C^* \cdot C) & \text{if } |J| > k \cdot C^* \cdot C \end{cases}$$

where J is v for b1, and w for b3;
sgn(J) is the sign bit of J.

Figure 8:
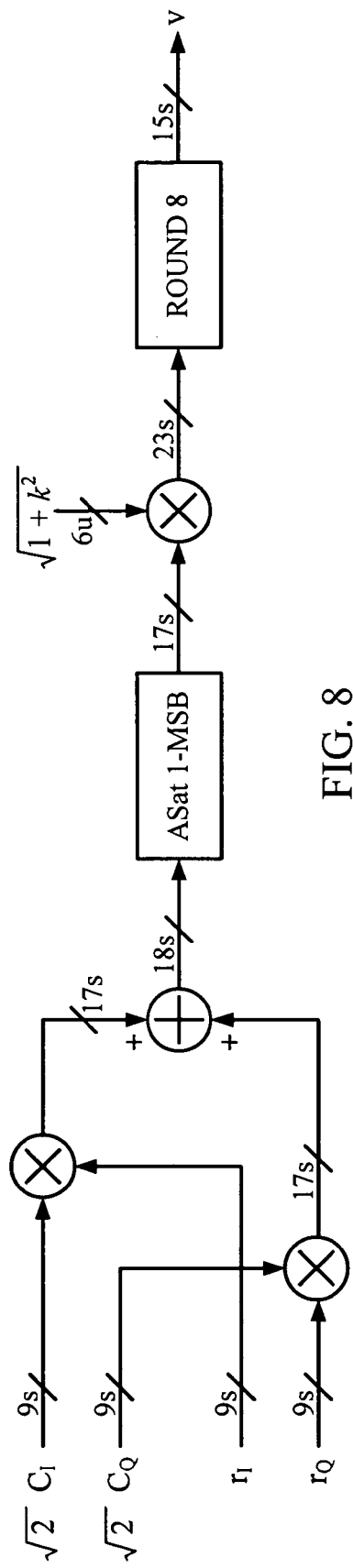
FIG. 8 is a detailed depiction showing an exemplary calculation of v.

FIG. 8 is a detailed depiction showing an exemplary calculation of v. This calculation can be performed in software, hardware, or a combination of software and hardware. As shown, v is determined in response to the following operations:

representing $C_I$, $C_Q$, $r_I$, and $r_Q$ as 9-bit signed integers, and $\sqrt{1+k^2}$ as a 6-bit unsigned integer;

$\sqrt{2}([(C_I) \cdot r_I]+[(C_Q) \cdot r_Q])=M$, saturated to a 17-bit signed integer; and, $M \cdot \sqrt{1+k^2}=v$, where the result is rounded to create a 15-bit signed integer.

Figure 9:
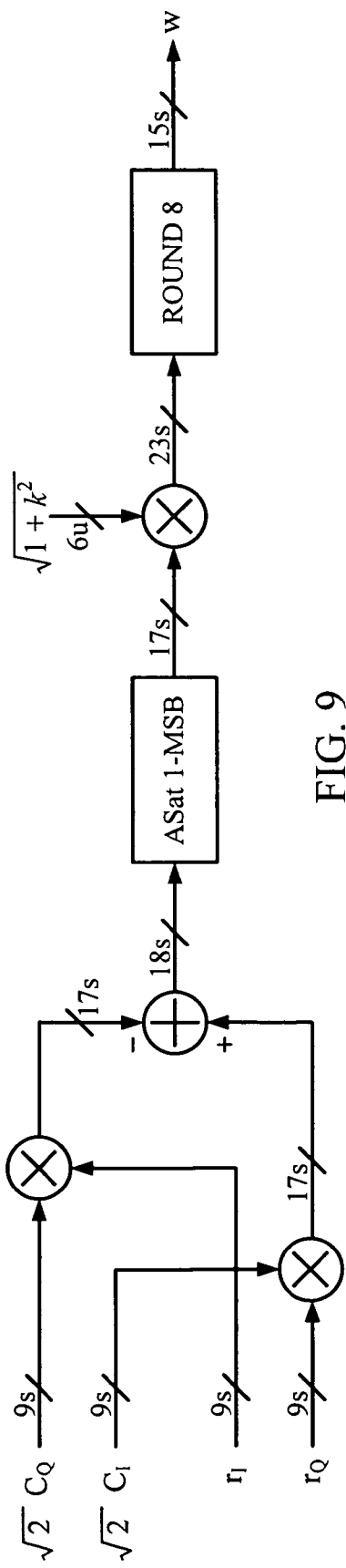
FIG. 9 is a detailed depiction showing an exemplary calculation of w.

FIG. 9 is a detailed depiction showing an exemplary calculation of w. As shown, w can be determined in response to the following operations:

representing $C_I$, $C_Q$, $r_I$, and $r_Q$ as 9-bit signed integers, and as a 6-bit unsigned integer;

$\sqrt{2}([(C_Q) \cdot r_Q]-[(C_I) \cdot r_I])=N$, saturated to a 17-bit signed integer; and, $N \cdot \sqrt{1+k^2}=w$, where the result is rounded to create a 15-bit signed integer.

Figure 10:
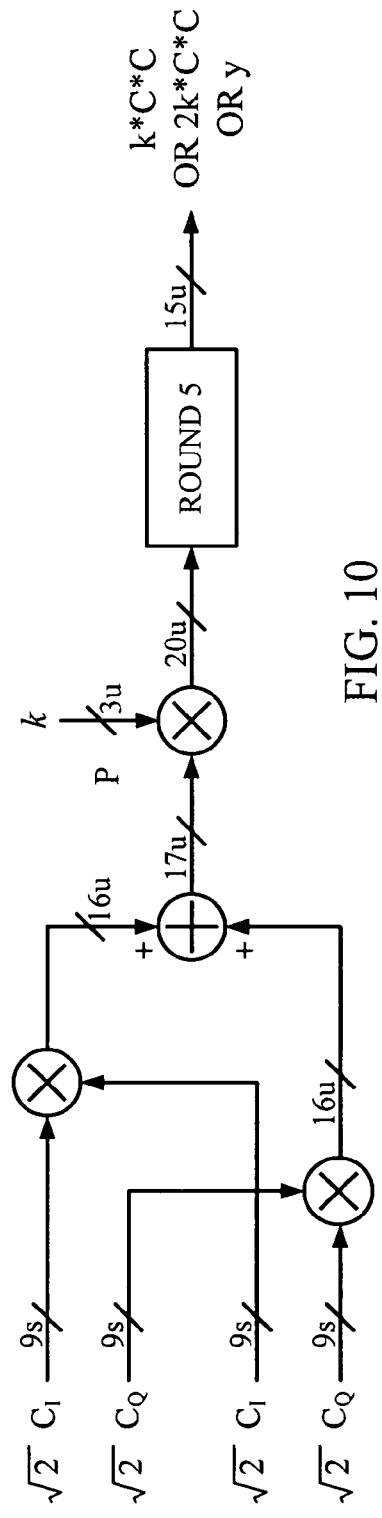
FIG. 10 is a detailed depiction showing an exemplary calculation of k·C*·C, or Y.

FIG. 10 is a detailed depiction showing an exemplary calculation of $k \cdot C^* \cdot C$, or Y. As shown, $k \cdot C^* \cdot C$ is determined in response to the following operations:

representing $C_I$ and $C_Q$ as 9-bit signed integers (a scaling factor or $2^7$), and k as a 3-bit unsigned integer;

$[(C_I) \cdot (C_I)]+[(C_Q) \cdot (C_Q)]=P$, a 17-bit unsigned integer (scaling factor of $2^{14}$); and, $P \cdot k = k \cdot C^* \cdot C$, where the result is rounded to create a 15-bit unsigned integer Y (scaling factor of $2^{11}$).

Figure 11:
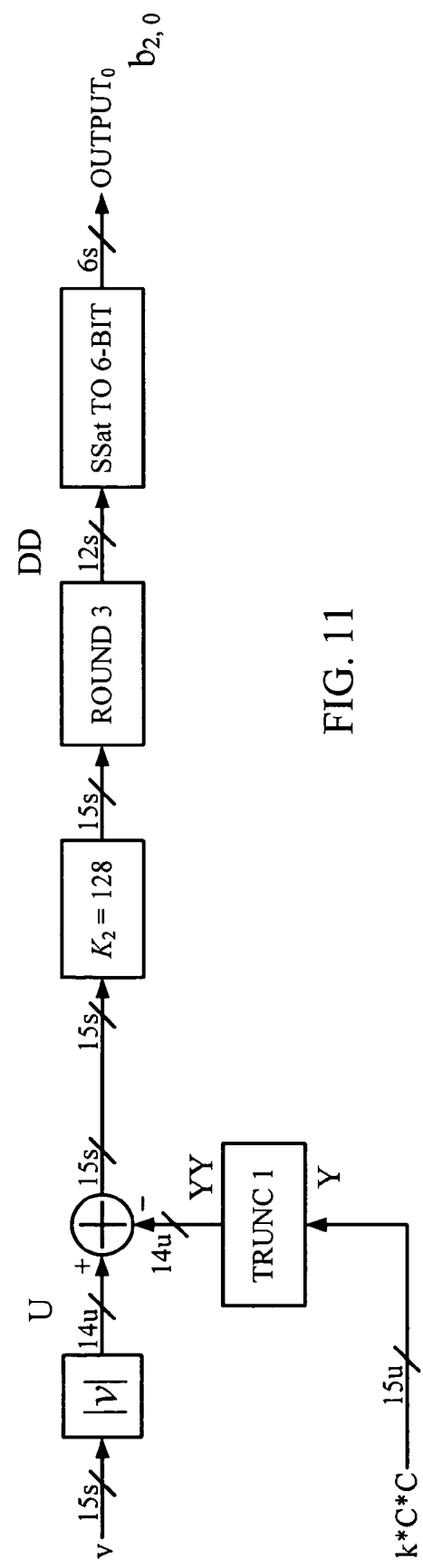
FIG. 11 is a detailed depiction of an exemplary calculation of b2 and b0.

FIG. 11 is a detailed depiction of an exemplary calculation of b2 and b0. As shown, b2 and b0 ($b_{2,0}$) are determined in response to the following operations:

truncating the least significant bit (LSB) of Y, creating a 14-bit unsigned integer YY;

taking the absolute value of J (where J is v for b0, and w for b2), creating a 14-bit unsigned integer U;

U−YY=R, a 15-bit signed integer;

left-shifting R by 7 bits (multiplying R by $2^7$);
rounding the result, creating a 12-bit signed integer DD; and,
saturating DD, creating a 6-bit signed integer $b_{2,0}$.

Figure 12:
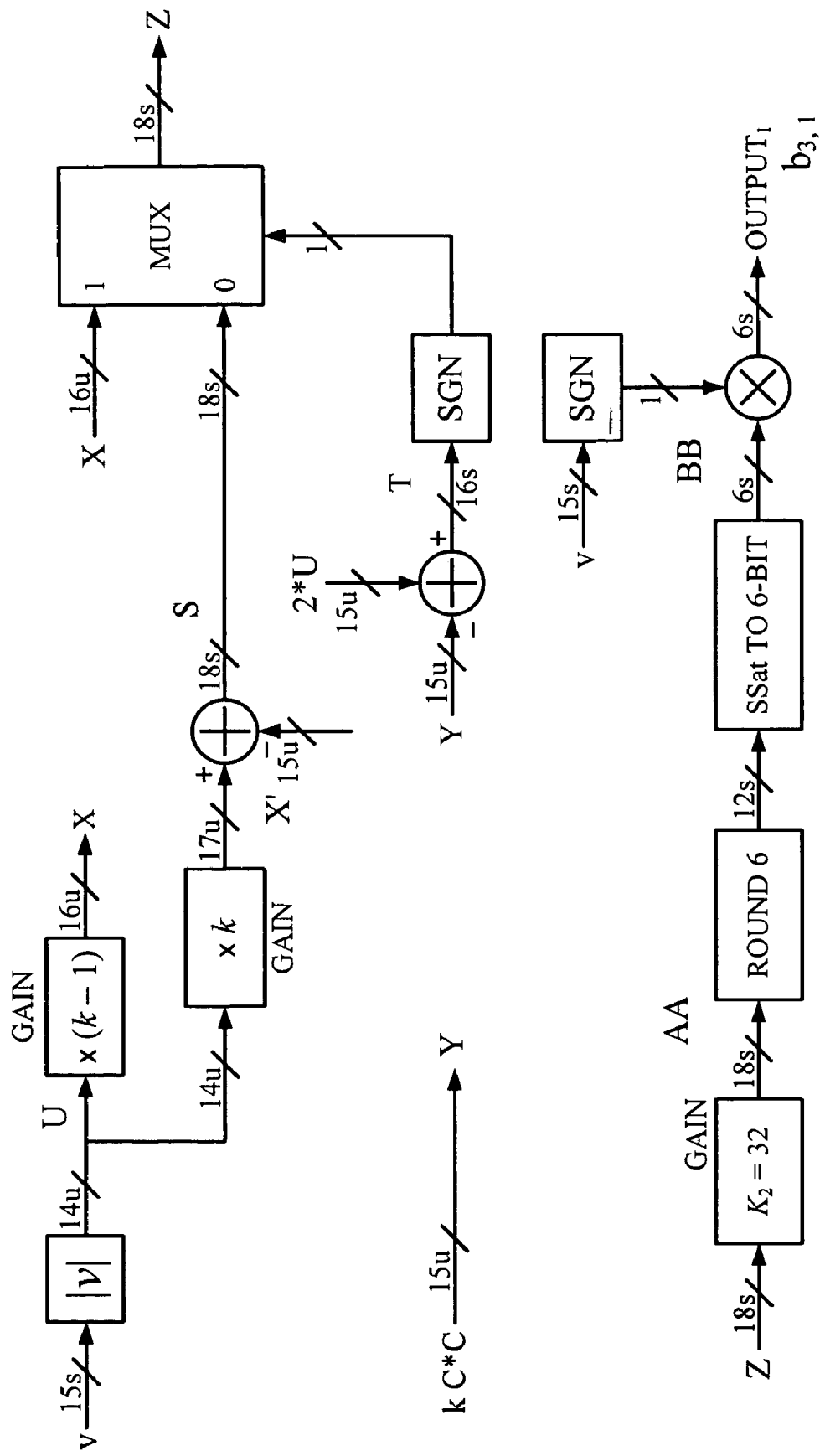
FIG. 12 is a detailed depiction of an exemplary calculation of b3 and b1.

FIG. 12 is a detailed depiction of an exemplary calculation of b3 and b1. As shown, b3 and b1 ($b_{3,1}$) can be determined in response to the following operations:

taking the absolute value of J (where J is v for b1, and w for b3), creating a 14-bit unsigned integer U;
U·(k−1)=X, a 16-bit unsigned integer;
U·k=X', a 17-bit unsigned integer;
X'−Y, creating an 18-bit signed integer S;
(2·U)−Y, creating a 16-bit signed integer T;
multiplexing X with S, using the sign bit of T as a select signal, creating an 18-bit unsigned integer Z;
left-shifting Z by 5 bits (multiplying by $2^5$);
rounding the result, creating a 12-bit signed integer AA; and,
saturating AA, creating a 6-bit signed integer BB;
multiplying BB by the most significant bit (the sign) of J, creating a 6-bit signed integer $b_{3,1}$.

Simulation results from a fixed point implementation show that the worst case performance degradation due to energy ratio mismatch is 0.1 dB for a repeated PEBD channel (120 km/hr) and a repeated ATSC channel (20 km/hr).

TABLE 1

Degradation due to mismatch with Rx energy ratio at 5.0625

| Layer | Tx Energy Ratio | ATSC ⅓ | ATSC ½ | ATSC ⅔ | PEDB ⅓ | PEDB ½ | PEDB ⅔ |
|---|---|---|---|---|---|---|---|
| Enhan. | 4.0 | ~0 dB | 0.03 dB | ~0 dB | ~0 dB | −0.06 dB | Floor |
| Enhan. | 6.25 | ~0 dB | ~0 dB | Floor | 0.05 dB | 0.1 dB | Floor |
| Base | 4.0 | −0.05 dB | −0.05 dB | −0.25 dB | ~0 dB | ~0 dB | 0.05 dB |
| Base | 6.25 | 0.03 dB | −0.1 dB | ~0 dB | ~0 dB | ~0 dB | 0.08 dB |

In the layered modulation studied, the base layer and enhancement layer were unequally error protected. The base layer is typically better protected than enhancement layer. A negative value in Table 1 means that the performance using the mismatched $k^2$ is even better than can be obtained using the matched energy ratio.

Figure 13:
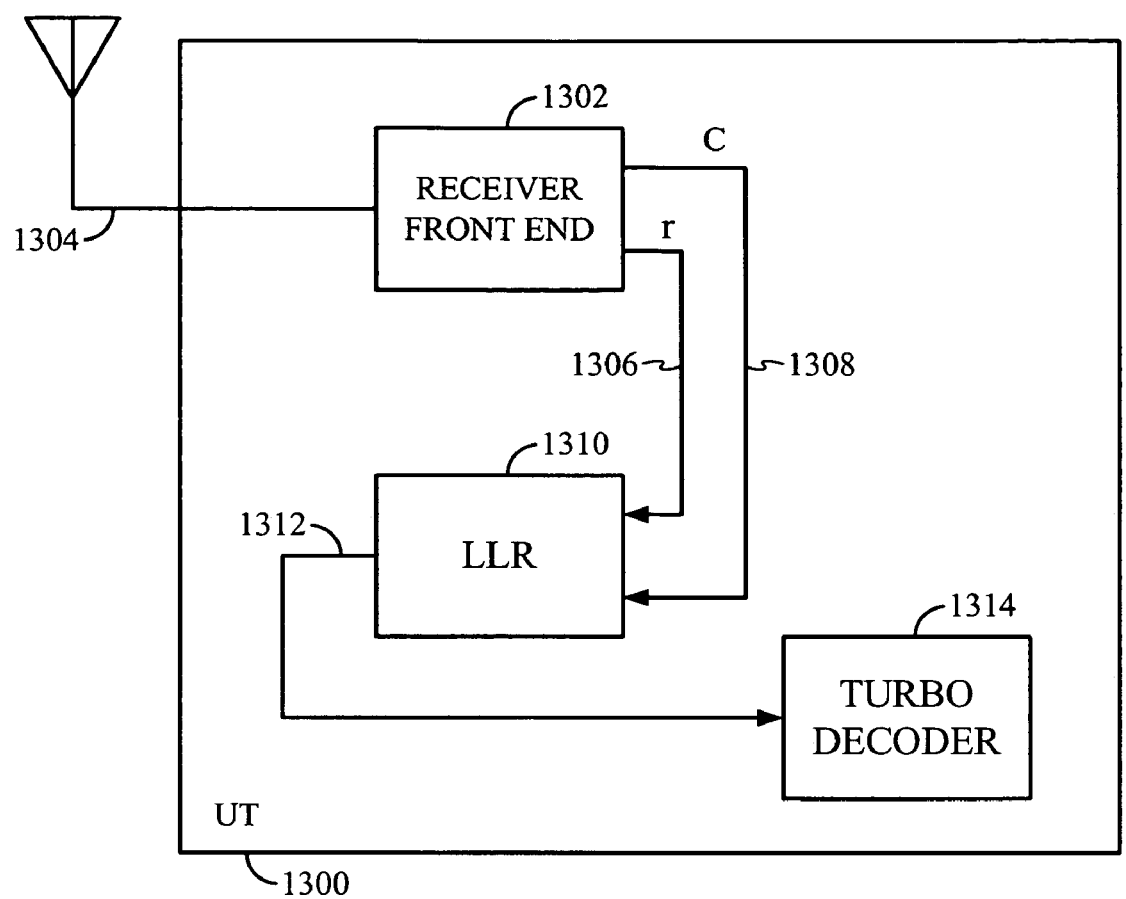
FIG. 13 is a schematic block diagram of a wireless communications UT, for generating bit LLR values for two-layered QPSK turbo decoding.

FIG. 13 is a schematic block diagram of a wireless communications UT, for generating bit LLR values for two-layered QPSK turbo decoding. The UT 1300 comprises a receiver front end 1302 having an air interface input on line 1304 to accept a two-layered QPSK signal with an energy ratio of either $k1^2$ or $k2^2$, and outputs on lines 1306 and 1308 to supply a complex received signal components (r) and complex channel estimates (C), respectively. A log likelihood ratio (LLR) module 1310 has inputs on lines 1306 and 1308 to receive the complex received signal components and complex channel estimates. FIG. 13 is a simplified version of the system shown in FIG. 4. Elements 410, 420, 430, and 440 of FIG. 4 may be understood to perform many of the functions performed by the receiver front end 1302 of FIG. 13. In some aspects, UT 1300 can be enabled to perform as UT 110 of FIG. 1.

The LLR module 1310 selects a mismatched energy ratio ($k^2$) between $k1^2$ and $k2^2$, and supplies bit LLR values for two-layered QPSK turbo decoding at an output on line 1312, using the $k^2$ energy ratio. Output 1312 is connected to turbo decoder 1314. Typically, the LLR module 1310 selects $k^2$ as the approximate midpoint between $k1^2$ and $k2^2$. For example, if the receiver 1302 accepts a two-layered QPSK signal with an energy ratio of either about 4 or about 6.25, then the LLR module 1410 selects $k^2$ to be equal to about 5.0625.

As described above in the explanation of FIGS. 7-11, the receiver 1402 accepts a two-layered QPSK signal with in phase (I) and quadrature (Q) components, and the LLR module 1410 generates four LLR bit values (b3, b2, b1, and b0).

The LLR module 1310 determines the LLR values for each b0 and b2 bit as follows:

$$LLR_{2,0} = \frac{1}{N_0} \times \frac{2}{1+k^2} \times (|J| - k \cdot C^* \cdot C);$$

where J is v for b0, and w for b2;
$v = \sqrt{2(1+k^2)} \text{Re}[C^*r]$;
$w = \sqrt{2(1+k^2)} \text{Im}[C^*r]$;
r is the complex received signal;
C is the complex channel estimate; and,
C* is the complex conjugate of C.

The LLR module 1310 determines the LLR values for each b1 and b3 bit as follows:

$$LLR_1 = \frac{1}{N_0} \times \frac{2}{1+k^2} \times sgn(J) \times \begin{cases} (k-1)|J| & \text{if } |J| \le k \cdot C^* \cdot C \\ k(|J| - C^* \cdot C) & \text{if } |J| > k \cdot C^* \cdot C \end{cases}$$

where J is v for b1, and w for b3; and,
sgn(J) is the sign bit of J.

Additional details of the LLR functions can be found in the explanation of FIGS. 7-11 above, and are not repeated here in the interest of brevity.

Figure 14:
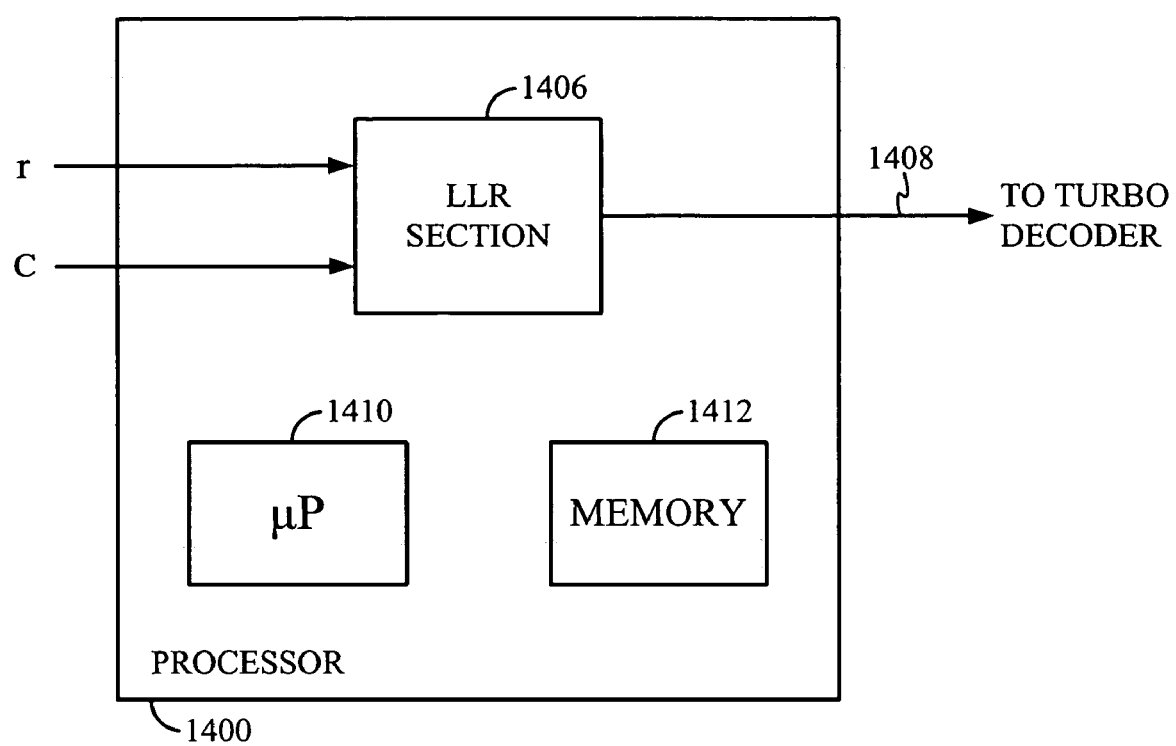
FIG. 14 is a schematic block diagram of a processor for generating bit LLR values for two-layered QPSK turbo decoding.

FIG. 14 is a schematic block diagram of a processor for generating bit LLR values for two-layered QPSK turbo decoding. The processor 1400 comprises inputs on line 1402 to receive complex received signals and complex channel estimates on line 1404 for QPSK symbols.

A log likelihood ratio (LLR) section 1406 has inputs on lines 1402 and 1404 to receive the complex received signals (r) and complex channel estimates (C). The LLR section 1406 selects a mismatched energy ratio ($k^2$) between $k1^2$ and $k2^2$ and generates bit LLR values for two-layered QPSK turbo decoding, using the $k^2$ energy ratio. Outputs on line 1408 are connected to a turbo decoder (not shown). Typically, the LLR section 1406 selects $k^2$ as the approximate midpoint between $k1^2$ and $k2^2$. For example, if processor inputs 1402/1404 accept complex received signal and complex channel estimates for a two-layered QPSK signal with an energy ratio of either about 4 or about 6.25, the LLR section 1406 selects $k^2$ to be equal to about 5.0625.

Also shown are a microprocessor (μP) 1410 and memory 1412. Some, or all of the above-mentioned processes may be performed with the aid of microprocessor executable instructions stored in memory 1412. In that case, the invention can alternately be described as a signal bearing medium tangibly embodying a program of machine-readable instructions, stored in memory 1412, executable by a digital processing apparatus, such as microprocessor 1410, to perform operations for generating bit LLR values for two-layered QPSK turbo decoding. The operations include the steps of: receiving a two-layered QPSK signal with an energy ratio of either $k1^2$ or $k2^2$; selecting a mismatched energy ratio ($k^2$) between $k1^2$ and $k2^2$; and, generating bit LLR values for two-layered QPSK turbo decoding, using the mismatched $k^2$ energy ratio.

Selecting the mismatched $k^2$ energy ratio may include determining the approximate midpoint between $k1^2$ and $k2^2$, and setting $k^2$ equal to the approximate midpoint. For example, if the energy ratio is either about 4 or about 6.25, then $k^2$ is selected to be equal to about 5.0625. Additional details of the LLR functions can be found in the explanation of FIGS. 7-11 above, and are not repeated here in the interest of brevity.

Figure 15:
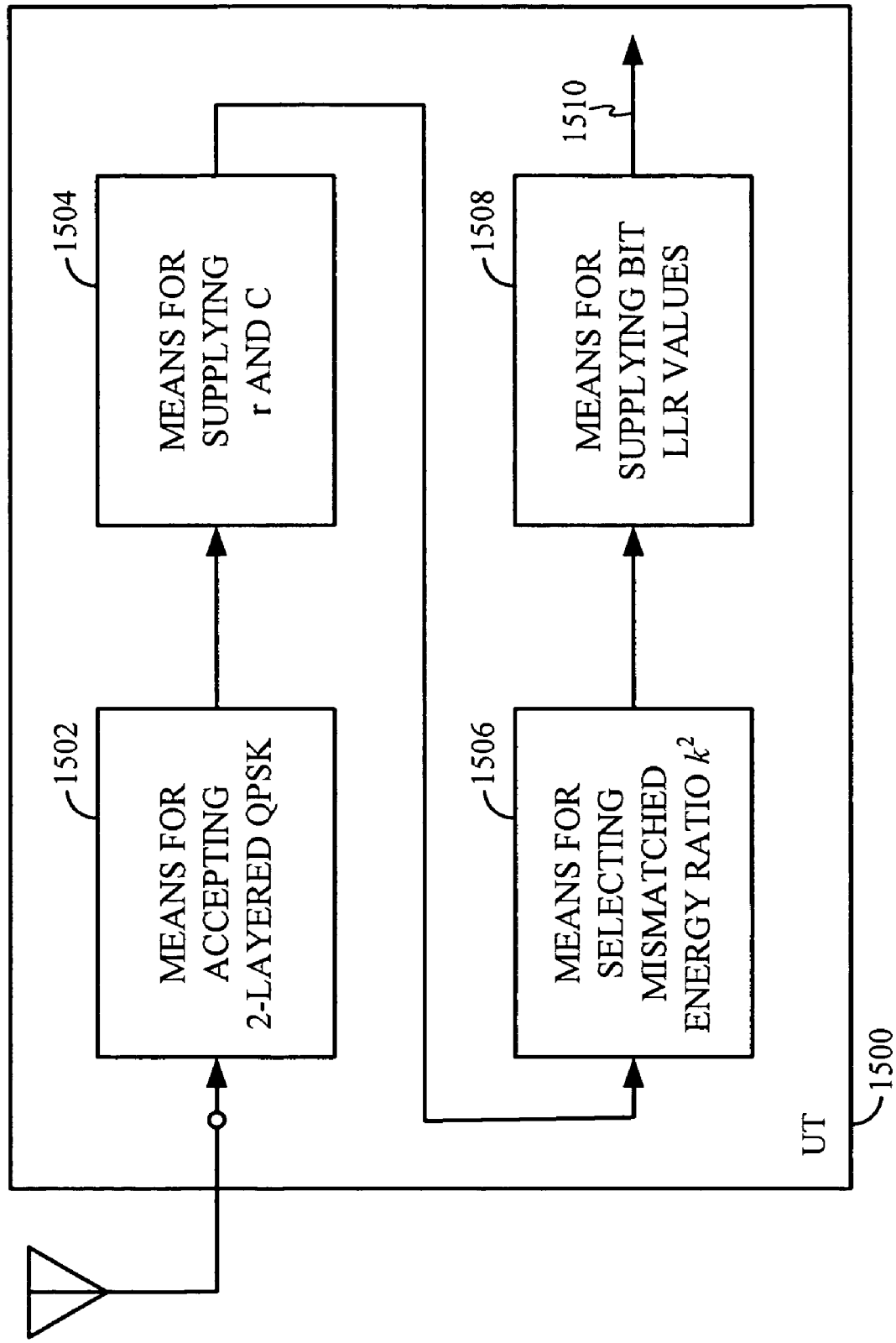
FIG. 15 is a schematic block diagram depicting another variation of a wireless communications UT for generating bit LLR values for two-layered QPSK turbo decoding.

FIG. 15 is a schematic block diagram depicting another variation of a wireless communications UT for generating bit LLR values for two-layered QPSK turbo decoding. The UT 1500 comprises a means 1502 for accepting a two-layered QPSK signal with an energy ratio of either $k1^2$ or $k2^2$. The UT comprises a means 1504 for supplying a complex received signal components (r) and complex channel estimates (C). The UT further comprises a means 1506 for selecting a mismatched energy ratio ($k^2$) between $k1^2$ and $k2^2$, and a means 1508 for supplying bit LLR values for two-layered QPSK turbo decoding at an output 1510, using the $k^2$ energy ratio. Typically, means 1506 selects $k^2$ as the approximate midpoint between $k1^2$ and $k2^2$. For example, if means 1502 accepts a two-layered QPSK signal with an energy ratio that is known to be either about 4 or about 6.25, then means 1506 selects $k^2$ to be equal to about 5.0625.

The various illustrative logical blocks, modules, and circuits described in connection with the UT and processor disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

A system and method have been provided for decoding a two-layered QPSK signal with an unknown energy ratio. Examples of specific energy ratios and exemplary calculation schemes have been presented to illustrate the invention. However, the invention is not limited to just these examples. Likewise, although a two-layered QPSK signal has been described, the present invention system and method are equally applicable to multi-layered QPSK.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein. Other variations and embodiments of the invention will occur to those skilled in the art.

What is claimed is:

1. In a wireless communications user terminal (UT), a method for generating bit log likelihood ratio (LLR) values for two-layered quadrature phase-shift keying (QPSK) turbo decoding, the method comprising:

receiving a two-layered QPSK signal with in phase (I) and quadrature (Q) components per symbol and with an energy ratio selected from a group comprising $k1^2$ and $k2^2$;

selecting a mismatched energy ratio ($k^2$) between $k1^2$ and $k2^2$; and generating said bit LLR values for the two-layered QPSK turbo decoding, using the mismatched $k^2$ energy ratio and including determining said LLR values for four bits (b3, b2, b1, and b0), wherein determining the bit LLR values includes determining the bit LLR values for each b0 and b2 bit as follows:

$$LLR_{2,0} = \frac{1}{N_0} \times \frac{2}{1+k^2} \times (|J| - k \cdot C^* \cdot C);$$

where J is v for b0, and w for b2;
v=$\sqrt{2(1+k^2)}$Re[C*r];
w=$\sqrt{2(1+k^2)}$Im[C*r];
r is the complex received signal;
C is the complex channel estimate; and,
C* is the complex conjugate of C.

2. The method of claim 1 wherein determining the bit LLR values includes determining the LLR values for each b1 and b3 bit as follows:

$$LLR_1 = \frac{1}{N_0} \times \frac{2}{1+k^2} \times sgn(J) \times \begin{cases} (k-1)|J| & \text{if } |J| \leq k \cdot C^* \cdot C \\ k(|J| - C^* \cdot C) & \text{if } |J| > k \cdot C^* \cdot C \end{cases}$$

where J is v for b1, and w for b3;
sgn(J) is the sign bit of J.

3. A wireless communications user terminal (UT) for generating bit log likelihood ratio (LLR) values for two-layered quadrature phase-shift keying (QPSK) turbo decoding, the UT comprising:

a receiver having an air interface input to accept a two-layered QPSK signal with in phase (I) and quadrature (Q) components and with an energy ratio selected from a group comprising $k1^2$ and $k2^2$, and having outputs to supply a complex received signal components and complex channel estimates; and a LLR module having inputs to receive the complex received signal components and complex channel estimates, the LLR module determining four bit LLR values (b3, b2, b1, and b0), and the LLR module selecting a mismatched energy ratio ($k^2$) between $k1^2$ and $k2^2$, and supplying said bit LLR values for two-layered QPSK turbo decoding at an output, using the mismatched energy ratio ($k^2$), wherein the LLR module determines the LLR values for each b0 and b2 bit as follows:

$$LLR_{2,0} = \frac{1}{N_0} \times \frac{2}{1+k^2} \times (|J| - k \cdot C^* \cdot C);$$

where J is v for b0, and w for b2;

$v = \sqrt{2(1+k^2)} \operatorname{Re}[C^*r];$ $w = \sqrt{2(1+k^2)} \operatorname{Im}[C^*r];$ r is the complex received signal;

C is the complex channel estimate; and,

C* is the complex conjugate of C.

4. The UT of claim 3 wherein the LLR module determines the LLR values for each b1 and b3 bit as follows:

$$LLR_1 = \frac{1}{N_0} \times \frac{2}{1+k^2} \times sgn(J) \times \begin{cases} (k-1)|J| & \text{if } |J| \leq k \cdot C^* \cdot C \\ k(|J| - C^* \cdot C) & \text{if } |J| > k \cdot C^* \cdot C \end{cases}$$

where J is v for b1, and w for b3; and, sgn(J) is the sign bit of J.

* * * * *

UNITED STATES PATENT AND TRADEMARK OFFICE
CERTIFICATE OF CORRECTION

PATENT NO. : 7,660,368 B2
APPLICATION NO. : 11/330652
DATED : February 9, 2010
INVENTOR(S) : Ling et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this

Twenty-eighth Day of December, 2010

David J. Kappos
*Director of the United States Patent and Trademark Office*